United States Patent
Hofmann et al.

(10) Patent No.: US 8,047,723 B2
(45) Date of Patent: Nov. 1, 2011

(54) SINGLE-ROW SPHERICAL ROLLER BEARING WITH INCREASED AXIAL LOAD CAPACITY

(75) Inventors: Heinrich Hofmann, Schweinfurt (DE); Horst Doppling, Herzogenaurach (DE); Rainer Eidloth, Herzogenaurach (DE); Georg Goppelt, Pfofeld (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 394 days.

(21) Appl. No.: 12/298,686

(22) PCT Filed: Apr. 17, 2007

(86) PCT No.: PCT/DE2007/000663
§ 371 (c)(1),
(2), (4) Date: Oct. 27, 2008

(87) PCT Pub. No.: WO2007/121710
PCT Pub. Date: Nov. 1, 2007

(65) Prior Publication Data
US 2009/0180724 A1 Jul. 16, 2009

(30) Foreign Application Priority Data
Apr. 26, 2006 (DE) .......................... 10 2006 019 230

(51) Int. Cl.
*F16C 33/36* (2006.01)
(52) U.S. Cl. ..................................................... 384/568
(58) Field of Classification Search .................. 384/450, 384/491, 558, 568, 513–516
See application file for complete search history.

(56) References Cited

U.S. PATENT DOCUMENTS

| | | | | |
|---|---|---|---|---|
| 1,310,423 | A | * | 7/1919 | Lippert-Bruenauer ....... 384/516 |
| 3,020,106 | A | | 7/1959 | Mims |
| 3,620,585 | A | | 11/1971 | Anderson et al. |
| 3,813,135 | A | * | 5/1974 | Martinie ...................... 384/491 |

(Continued)

FOREIGN PATENT DOCUMENTS

CH 99346 5/1923

(Continued)

*Primary Examiner* — Thomas R Hannon
(74) *Attorney, Agent, or Firm* — Volpe And Koenig, P.C.

(57) ABSTRACT

A radial anti friction bearing (1) which is configured as a single-row spherical roller bearing, which includes an outer bearing ring (2), an inner bearing ring (3) and a plurality of spherical rollers (5) that are arranged between the bearing rings (2, 3). The spherical rollers have respectively two side faces (6, 7) which are flattened symmetrically from a spherical base shape, are retained with uniform spacing to each other a bearing cage (4) and roll with their running faces (8) in two groove-shaped raceways (11, 12) which are defined, respectively, by two axial rims (13, 14 and 15, 16). The width ($b_K$) of the spherical rollers (5) between their side faces (6, 7) is smaller than the distance ($a_B$) between the radially opposing axial rims (13, 15 and 14, 16), such that the spherical rollers (5) can be in the space therebetween via the axial mounting method in the radial anti friction bearing. The radial anti-friction bearing (1) has an increased axial load capacity suitable for variable axial loads at a operational pressure angle ($\alpha$) of up to 20° on both sides of the bearing longitudinal axis (17), in which the raceways (11, 12) in both bearing grooves (2, 3) are formed with an increased depth ($t_{LA}$, $t_{LI}$) and width ($b_{LA}$, $b_{LI}$) and the spherical rollers (5) have a width ($b_K$) between their side surfaces (6, 7) which is arranged to the operational pressure angle ($\alpha$) at 20°.

4 Claims, 2 Drawing Sheets

U.S. PATENT DOCUMENTS

| | | | |
|---|---|---|---|
| 3,905,660 A * | 9/1975 | Fletcher et al. | 384/544 |
| 4,741,632 A | 5/1988 | Jacobson | |
| 6,554,480 B2 * | 4/2003 | Ishiguro et al. | 384/516 |
| 2005/0117827 A1 | 6/2005 | Fujii et al. | |
| 2006/0013519 A1 * | 1/2006 | Fukunaga | 384/450 |

FOREIGN PATENT DOCUMENTS

| | | |
|---|---|---|
| DE | 168499 | 2/1903 |
| DE | 151483 | 5/1904 |
| DE | 311317 | 3/1919 |
| DE | 2407477 | 8/1975 |
| DE | 3248980 | 8/1983 |
| DE | 4334195 | 3/1994 |
| DE | 10392207 | 1/2005 |
| DE | 102005061792 | 7/2007 |
| GB | 249806 | 5/1926 |
| GB | 317407 | 8/1929 |
| GB | 2058243 A * | 4/1981 |
| GB | 2298682 | 9/1996 |

* cited by examiner

SINGLE-ROW SPHERICAL ROLLER BEARING WITH INCREASED AXIAL LOAD CAPACITY

FIELD OF THE INVENTION

The invention relates to a radial anti-friction bearing that is suitable for high axial loads. The invention can be realized in an especially advantageous way with single-row spherical roller bearings that can be used, for example, as fixed bearings for the driving and driven shafts of a motor-vehicle gear box.

BACKGROUND

As radial anti-friction bearings that can also be loaded with high axial forces, in practice, primarily single-row deep groove ball bearings are used, because these feature a uniform high radial and axial load capacity, low friction, and the highest rotational speed limits of all bearing types. These deep groove ball bearings are made, in a known way, from an outer bearing ring and an inner bearing ring, and also from a number of bearing balls arranged between the bearing rings as anti-friction bodies. Here, in the inside of the outer bearing ring and in the outside of the inner bearing ring, groove-shaped raceways are incorporated that are each limited by two axial rims and in which the bearing balls are guided spaced apart at uniform distances relative to each other by a bearing cage. The use of the bearing balls in the deep groove ball bearing is here usually realized by the eccentric mounting method that has become known with DE 168 499 in which the two bearing rings are arranged eccentric to each other and the resulting free space between the bearing rings is filled with the bearing balls. Then the inner bearing ring is brought into a position concentric to the outer bearing ring under use of the elasticity of both bearing rings, so that the bearing balls can then be distributed uniformly in the raceways of the bearing rings and the bearing cage can be used.

In practice, however, it has been proven that such deep groove ball bearings are nevertheless subject to limits primarily with respect to the radial load capacity of the bearing due to the small maximum number of balls that can be installed. This number is dependent on the dimensions of the inner and the outer bearing rings and also the ball diameter. Therefore, in the past a plurality of solutions, such as, for example, an unsealed filling opening according to DE 151 483 arranged in opposite rims of the raceways of the outer and the inner bearing rings or a similarly constructed closable filling opening according to DE 24 07 477 A1, has been proposed with which an increase of the radial load capacity by deep groove ball bearings should be achieved by increasing the number of balls. These proposals, however, cannot be realized in practice due to numerous disadvantages.

In addition, another possibility for increasing the number of anti-friction bodies in a radial anti-friction bearing has become known first through DE 311 317 and was improved by DE 43 34 195 A1. For these radial anti-friction bearings formed as single-row deep groove ball bearings, however, the anti-friction bodies are formed not by balls but instead by so-called spherical rollers that are formed with two side surfaces flattened symmetrically from a spherical base shape and also side surfaces arranged parallel to each other. The width of these spherical rollers between their side surfaces is here less than the distance between the radially opposing axial rims of the raceways in the bearing rings, so that filling the bearing with spherical rollers can be performed with the so-called axial mounting method in which the spherical rollers can be inserted in the axial direction into the bearing through the space between the inner ring and the outer ring. If the center point of the bearing rollers is then located at the height of the raceway axis, the spherical rollers are turned once vertically and once horizontally by 90°, so that they can roll with their running surfaces in the raceways of the bearing rings.

However, despite the possibility of inserting these specially shaped spherical rollers axially into the bearing and thus filling the radial anti-friction bearings almost completely with a high number of anti-friction bodies that can be used for high radial loads, such a spherical roller bearing represents only a compromise with respect to the axial load capacity of the bearing. This is based on the fact that the spherical rollers can have a construction that is only relatively flat due to their ability to be inserted in the axial direction into the bearing only with a small width between their side surfaces and the raceways of the spherical rollers in the bearing rings, in order to be able to allow the rotation of the anti-friction bodies into their operating position, without producing too much radial play in the entire bearing. The relatively flat raceways of the spherical rollers, however, cause a relatively small clearance space for axial tilting of the spherical rollers within their raceways, so that primarily the axial load capacity of such a spherical roller bearing is comparatively low and such spherical roller bearings are thus unsuitable for variable axial loads under high operating pressure angles.

SUMMARY

Starting from the illustrated disadvantages of the solutions of the known state of the art, the invention is based on the objective of providing a radial anti-friction bearing, in particular, a single-row spherical roller bearing that is also suitable, in addition to a high radial load capacity, for variable axial loads under high operating pressure angles on both sides of the bearing longitudinal axis.

According to the invention, this objective is met for a radial anti-friction bearing in that, first, the raceways are formed in both bearing rings with an increased depth and width and, second, the spherical rollers have a width between their side surfaces tuned to an operating pressure angle of 20°.

Preferred configurations and improvements of the radial anti-friction bearing formed according to the invention are described in the dependent claims.

According to another aspect of the invention, it is provided in the radial anti-friction bearing formed according to the invention that the depth of the raceways in the inside of the outer bearing ring and in the outside of the inner bearing ring equals approximately 20% of the diameter of the spherical base shape of the spherical rollers, while the width of the raceways in the bearing rings equals approximately 80% of the diameter of the spherical base shape of the spherical rollers. The formation of the raceways with such dimensions clearly actually goes slightly beyond the raceway dimensions of conventional deep groove ball bearings and guarantees that the spherical rollers feature a high degree of osculation relative to their raceways as a function of the radial bearing clearance even for operating pressure angles up to 25° and the bearing thus maintains the full radial and axial load capacity even for mixed axial and radial loading.

Finally, according to another aspect of the invention, the radial anti-friction bearing formed according to the invention also has the feature that the width of the spherical rollers between their side surfaces equals approximately 55% and the distance between the radially opposing, axial rims of the raceways equals approximately 60% of the diameter of the spherical base shape of the spherical rollers. The width of the spherical rollers of 55% of its spherical base shape here represents an optimum in so far as spherical rollers with this width, first, can be easily installed through the space between the rims of the raceways dimensioned with 60% of the spherical base shape and, second, this width is tuned to an operating pressure angle of 20° to the extent that the spherical rollers can be aligned in the axial direction to such an operating pressure angle even for high axial forces and then also still have, with their running surfaces, 100% contact with the raceways in the bearing rings, without negatively affecting the full radial and axial load capacity of the spherical roller bearing.

The spherical roller bearing formed according to the invention thus has the advantage relative to the spherical roller bearings known from the state of the art that it is now suitable, in addition to a high radial load capacity, also for variable axial loads under high operating pressure angles on both sides of the bearing longitudinal axis due to the configuration with very deep and very wide raceways for the spherical rollers in combination with the configuration of the spherical rollers with a width tuned to large operating pressure angles.

BRIEF DESCRIPTION OF THE DRAWINGS

A preferred embodiment of the radial anti-friction bearing formed according to the invention will be explained in more detail below with reference to the accompanying drawings. Shown herein are.

DETAILED DESCRIPTION OF THE DRAWINGS

Figure 1:
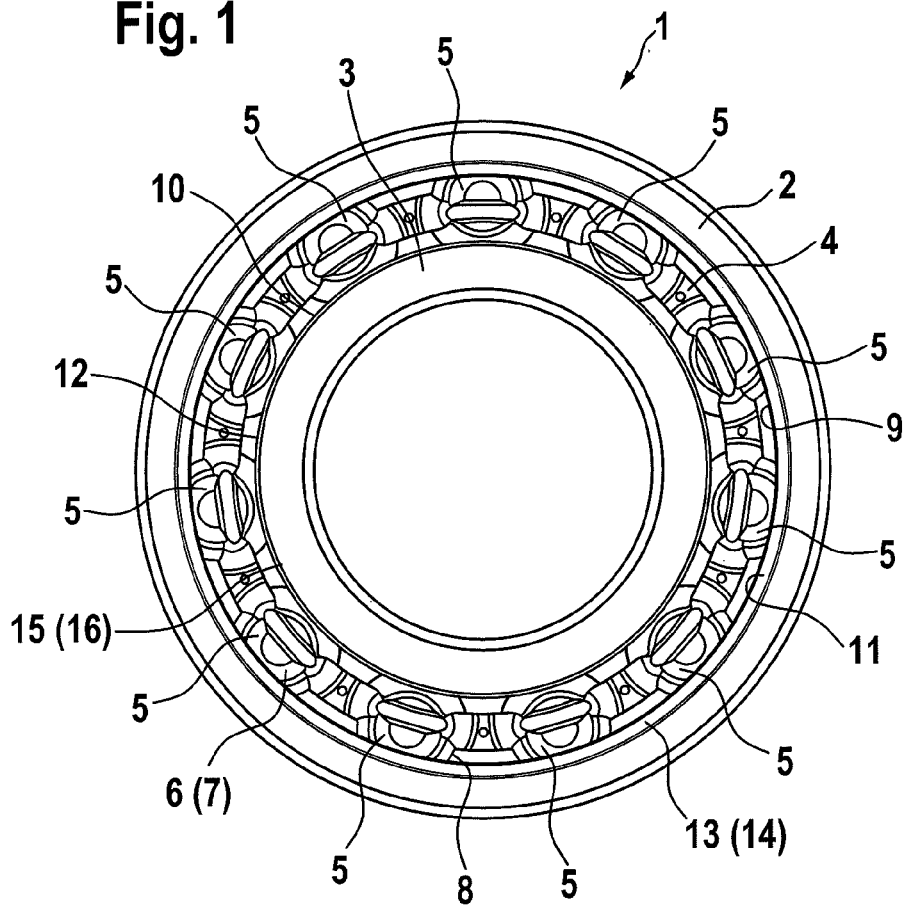
FIG. 1 is a side view of the spherical roller bearing formed according to the invention.
Figure 2:
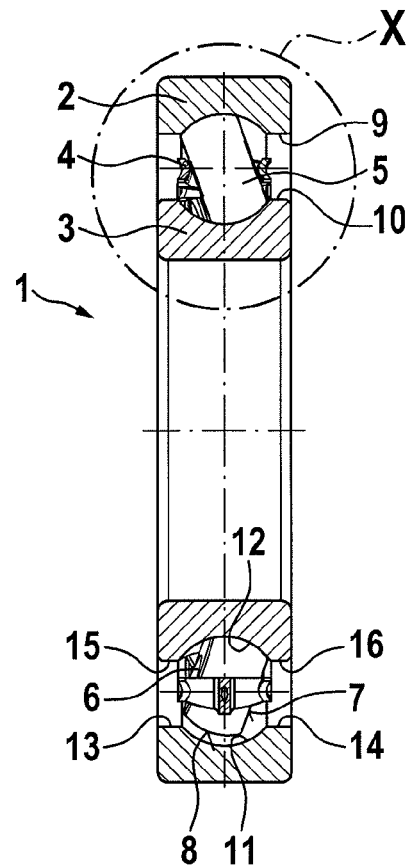
FIG. 2 is a cross sectional view through the spherical roller bearing formed according to the invention under axial load.

From FIGS. 1 and 2, a radial anti-friction bearing 1 formed as a single-row spherical roller bearing is shown that essentially includes an outer bearing ring 2 and an inner bearing ring 3 and also a plurality of spherical rollers 5 that are arranged between these bearing rings 2, 3 and that each have two side surfaces 6, 7 that are arranged parallel to each other and that are flattened symmetrically from a spherical base shape. These spherical rollers 4 are held at uniform distances from each other in the peripheral direction clearly visible through a bearing cage 4 and roll with their running surfaces 8 in two groove-shaped raceways 11, 12 formed in the inside 9 of the outer bearing ring 2 and in the outside 10 of the inner bearing ring 3. These raceways are each defined by two axial rims 13, 14 and 15, 16. The width $b_K$ of the spherical rollers 5 between their side surfaces 6, 7 is here, as emerges from FIG. 3, smaller than the distance $a_B$ between the radially opposing, axial rims 13, 15 and 14, 16 of the raceways 11, 12 in the bearing rings 2, 3, so that the spherical rollers 5 can be inserted through this distance $a_B$ in the axial mounting method into the radial anti-friction bearing 1.

In order to form a radial anti-friction bearing 1 constructed in this way with an increased axial load capacity that is suitable for variable axial loads under an operating pressure angle α of up to 20° on both sides of the bearing longitudinal axis 17, it is provided according to the invention that, first, the raceways 11, 12 in both bearing rings 2, 3 are formed with an increased depth $t_{LA}$, $t_{LI}$ and width $b_{LA}$, $b_{LI}$ and, second, the spherical rollers 5 have a width $b_K$ between their side surfaces 6, 7 and are arranged to an operating pressure angle α of 20°.

Figure 3:
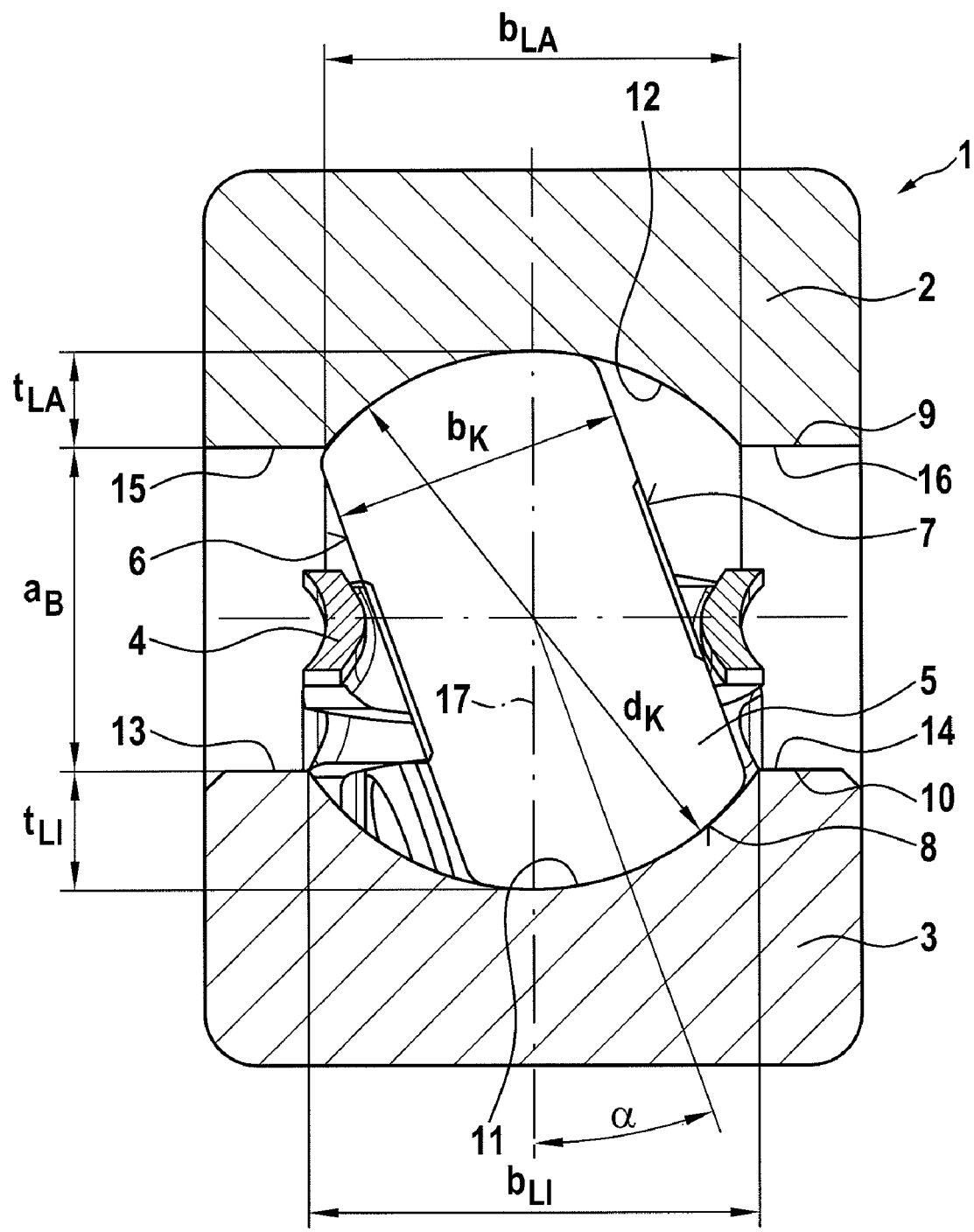
FIG. 3 is an enlarged view of one half of the cross section through the spherical roller bearing formed according to the invention according to detail X in FIG. 2.

Here, through FIG. 3 it is clear that the depth $t_{LA}$, $t_{LI}$ of the raceways 11, 12 in the inside 9 of the outer bearing ring 2 and in the outside 10 of the inner bearing ring 3 equals approximately 20% of the diameter $d_K$ of the spherical base shape of the spherical rollers 5, while the width $b_{LA}$, $b_{LI}$ of the raceways 11, 12 equals approximately 80% of the diameter $d_K$ of the spherical base shape of the spherical rollers 5.

From FIG. 3 it also follows that the width $b_K$ of the spherical rollers 5 between their side surfaces 6, 7 equals approximately 55% and the distance $a_B$ between the radially opposing, axial rims 13, 15 and 14, 16 of the raceways 11, 12 equals approximately 60% of the diameter $d_K$ of the spherical base shape of the spherical rollers 5. With this width $b_K$, first, the spherical rollers 5 can be easily mounted through the distance $a_B$ between the rims 13, 14, 15, 16 of the raceways 11, 12 and, second, this width is arranged to an operating pressure angle α of 20° to the extent that the spherical rollers 5 can be aligned in the axial direction to such an operating pressure angle α even for high axial forces and also then still have, with their running surfaces 8, 100% contact with the raceways 11, 12 in the bearing rings 2, 3.

LIST OF REFERENCE SYMBOLS

1 Radial anti-friction bearing
2 Outer bearing ring
3 Inner bearing ring
4 Bearing cage
5 Spherical rollers
6 Side surface of 5
7 Side surface of 5
8 Running surface of 5
9 Inside of 2
10 Outside of 3
11 Raceway in 9
12 Raceway in 10
13 Rim of 11
14 Rim of 11
15 Rim of 12
16 Rim of 12
17 Bearing longitudinal axis
$b_K$ Width of 5
$d_K$ Diameter of spherical base shape of 5
$t_{LA}$ Depth of 11
$t_{LI}$ Depth of 12
$b_{LA}$ Width of 11
$b_{LI}$ Width of 12
$a_B$ Distance between 13 and 15 or 14 and 16
α Operating pressure angle

The invention claimed is:

1. Radial anti-friction bearing, comprising a single-row spherical roller bearing that includes an outer bearing ring and an inner bearing ring and a plurality of spherical rollers that are arranged between the bearing rings and that are held at uniform distances from each other in a peripheral direction by a bearing cage and each of the spherical rollers have two side surfaces flattened symmetrically from a spherical base shape and arranged parallel to each other and roll with running surfaces thereof defined between the side surfaces in two groove-shaped raceways formed in an inside of the outer bearing ring and in an outside of the inner bearing ring, wherein the raceways are each defined by two axial rims, respectively, wherein a width of the spherical rollers between the side surfaces is less than a distance between the radially opposing, axial rims of the raceways in the bearing rings and the spherical rollers thus can be inserted through this distance in an axial mounting method into the radial anti-friction bearing, the radial anti-friction bearing has an axial load capacity that is suitable for variable axial loads under an operating pressure angle of up to 20° on both sides of a bearing longitudinal axis with the running surfaces having 100% contact with the raceways, and the width of the spherical rollers between the side surfaces is arranged for an operating pressure angle of 20°.

2. Radial anti-friction bearing according to claim 1, wherein the depth of the raceways in the inside of the outer bearing ring and in the outside of the inner bearing ring equals approximately 20% of a diameter of the spherical base shape of the spherical rollers.

3. Radial anti-friction bearing according to claim 2, wherein the width of the raceways in the inside of the outer bearing ring and in the outside of the inner bearing ring equals approximately 80% of the diameter of the spherical base shape of the spherical rollers.

4. Radial anti-friction bearing according to claim 3, wherein the width of the spherical rollers between the side surfaces equals approximately 55% and the distance between the radially opposing, axial rims of the raceways equals approximately 60% of the diameter of the spherical base shape of the spherical rollers.

* * * * *